US012185046B1

(12) United States Patent
Derman

(10) Patent No.: US 12,185,046 B1
(45) Date of Patent: Dec. 31, 2024

(54) EAR SUPPORTED AUDIO DEVICE

(71) Applicant: Jay S Derman, Carlsbad, CA (US)

(72) Inventor: Jay S Derman, Carlsbad, CA (US)

( * ) Notice: Subject to any disclaimer, the term of this patent is extended or adjusted under 35 U.S.C. 154(b) by 0 days.

(21) Appl. No.: 18/670,866

(22) Filed: May 22, 2024

Related U.S. Application Data

(63) Continuation-in-part of application No. 17/838,040, filed on Jun. 10, 2022, now Pat. No. 11,519,551.

(60) Provisional application No. 63/547,853, filed on Nov. 9, 2023, provisional application No. 63/215,062, filed on Jun. 25, 2021.

(51) Int. Cl.
*H04R 1/08* (2006.01)
*H04R 1/02* (2006.01)
*H04R 1/10* (2006.01)

(52) U.S. Cl.
CPC ........... *H04R 1/1008* (2013.01); *H04R 1/025* (2013.01); *H04R 1/105* (2013.01); *H04R 1/1066* (2013.01)

(58) Field of Classification Search
CPC .... H04R 1/025; H04R 1/1008; H04R 1/1033; H04R 1/1041; H04R 1/105; H04R 1/1058; H04R 1/1066; H04R 1/1075; H04R 1/2842; H04R 5/02; H04R 9/025; H04R 1/08; H04R 1/1016; H04R 1/1025; H04M 1/05
See application file for complete search history.

(56) References Cited

U.S. PATENT DOCUMENTS

| | | | | |
|---|---|---|---|---|
| 7,050,598 B1 * | 5/2006 | Ham | H04R 1/1058 | 381/381 |
| 7,099,464 B2 * | 8/2006 | Lucey | H04R 1/1066 | 381/381 |
| 7,356,362 B2 * | 4/2008 | Chang | H04R 1/1033 | 381/372 |
| 7,426,282 B1 * | 9/2008 | Poss | H04R 5/02 | 381/160 |
| 7,925,037 B2 * | 4/2011 | Te Riet | H04M 1/05 | 381/381 |
| 8,103,040 B2 * | 1/2012 | Pelland | H04R 1/1041 | 381/381 |
| 8,213,668 B2 * | 7/2012 | Tsao | H04R 1/1016 | 381/381 |
| 8,311,253 B2 * | 11/2012 | Silvestri | H04R 1/1075 | 381/381 |
| 8,605,934 B2 * | 12/2013 | Hagberg | H04R 1/1066 | 381/381 |
| 8,818,012 B2 * | 8/2014 | Pelland | H04R 1/1075 | 381/381 |
| 9,031,275 B2 * | 5/2015 | Brodsgaard | H04R 1/1066 | 381/381 |
| 2002/0090105 A1 * | 7/2002 | Jensen | H04R 1/08 | 381/381 |

(Continued)

*Primary Examiner* — Gerald Gauthier
(74) *Attorney, Agent, or Firm* — Plager Schack LLP; Mark H. Plager, Esq.; Naomi Mann, Esq.

(57) ABSTRACT

An ear supported audio device may comprise a cylindrical device housing configured hang from a top helix of a user's ear, the device housing including an inner wall, an outer wall, and a side wall extending between the inner wall and the outer wall. A speaker is attached to an interior side of the outer wall of the device housing, and a cutout forming an ear receiving slot is provided within the inner wall and bottom portion of the side wall. In one embodiment, a speaker pad may be provided on a side of the speaker facing the user's ear to block frequency for user comfort and ear health.

19 Claims, 4 Drawing Sheets

(56) References Cited

U.S. PATENT DOCUMENTS

| | | | | |
|---|---|---|---|---|
| 2005/0185814 | A1* | 8/2005 | Chen | H04R 1/1066 381/381 |
| 2006/0281502 | A1* | 12/2006 | Chang | H04R 1/1033 455/575.2 |
| 2007/0172091 | A1* | 7/2007 | Tsai | H04R 1/1025 381/381 |
| 2007/0217643 | A1* | 9/2007 | Chang | H04R 1/1066 381/381 |
| 2008/0310666 | A1* | 12/2008 | Wengreen | H04R 1/1066 381/381 |
| 2009/0067658 | A1* | 3/2009 | Lin | H04R 1/2842 381/345 |
| 2009/0123000 | A1* | 5/2009 | Wright | H04R 5/02 381/381 |
| 2011/0222719 | A1* | 9/2011 | Hagberg | H04R 1/1066 381/375 |
| 2012/0230532 | A1* | 9/2012 | Howell | H04R 1/1066 381/381 |
| 2013/0287241 | A1* | 10/2013 | Prelogar | H04R 1/105 381/381 |
| 2017/0238083 | A1* | 8/2017 | Smith | H04R 1/1058 381/381 |
| 2019/0104353 | A1* | 4/2019 | Ishikawa | H04R 1/1008 |
| 2020/0184945 | A1* | 6/2020 | Reimert | H04R 9/025 |

* cited by examiner

EAR SUPPORTED AUDIO DEVICE

RELATED APPLICATION

This application claims benefit to U.S. Provisional Application No. 63/547,853 filed on Nov. 9, 2023, which is incorporated by reference herein in its entirety.

BACKGROUND

The present disclosure relates generally to audio devices and systems.

Earbuds which channel sound directly into the ear are known to damage human hearing, amongst other safety concerns. Additionally, as earbuds insert directly into the ear, they may force wax into the ear drum. Headphones may uncomfortably press against the head and ears, and typically prevent the user from hearing other ambient sounds. Additionally, headphones are cumbersome to store.

As such, an improved audio that addresses the above-mentioned issues is desirable.

SUMMARY

According to various embodiments, disclosed is an ear supported audio device, which may comprise a cylindrical device housing configured to hang from a top helix of a user's outer ear, the device housing including an inner wall, an outer wall, and a side wall extending between the inner wall and the outer wall. A speaker is attached to an interior side of the outer wall of the device housing, and a cutout forming an ear receiving slot is provided within the inner wall and bottom portion of the side wall.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
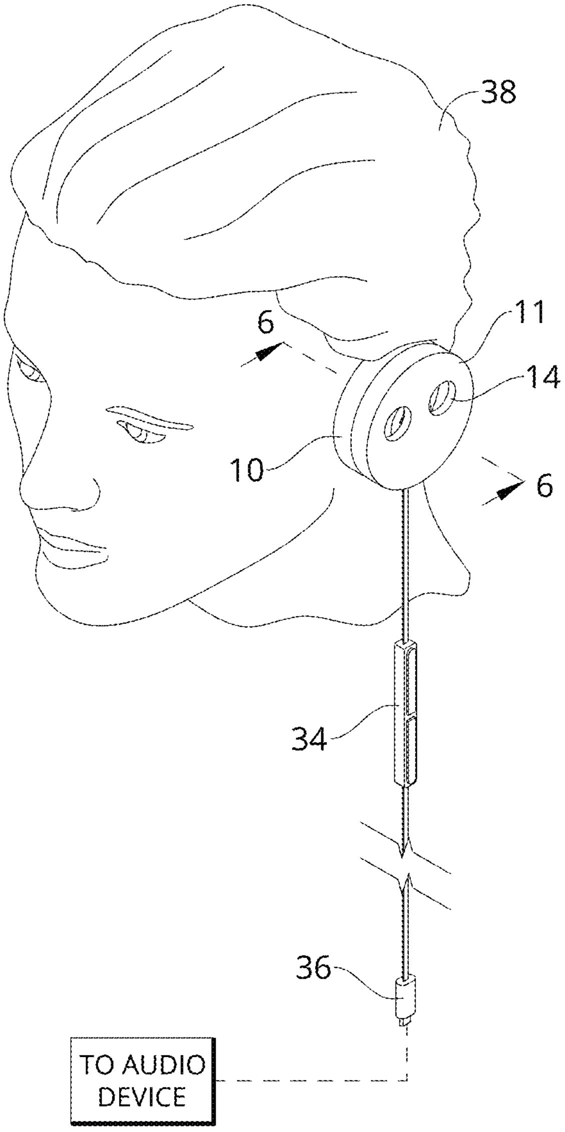
FIG. 1 is a perspective view of an audio ear speaker device, shown in use, according to certain embodiments.
Figure 2:
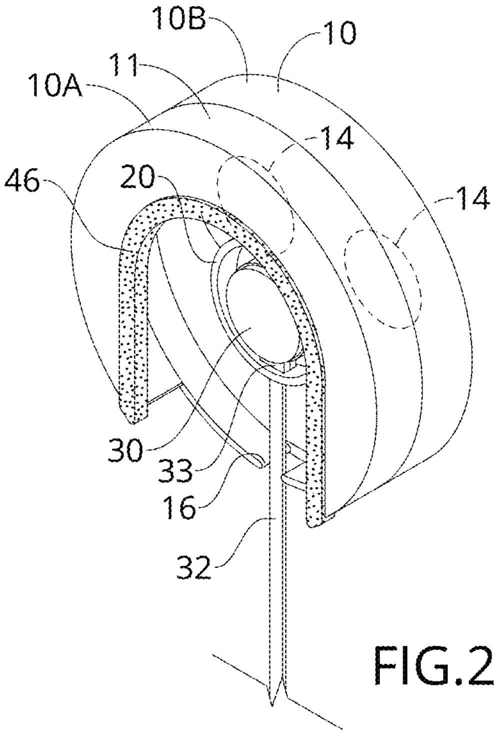
FIG. 2 is an inner perspective view of the device.
Figure 3:
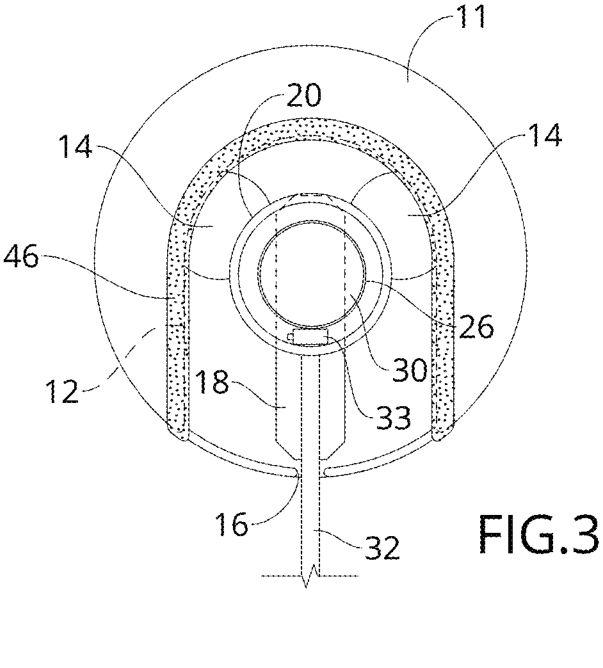
FIG. 3 is an inner plan view thereof.
Figure 4:
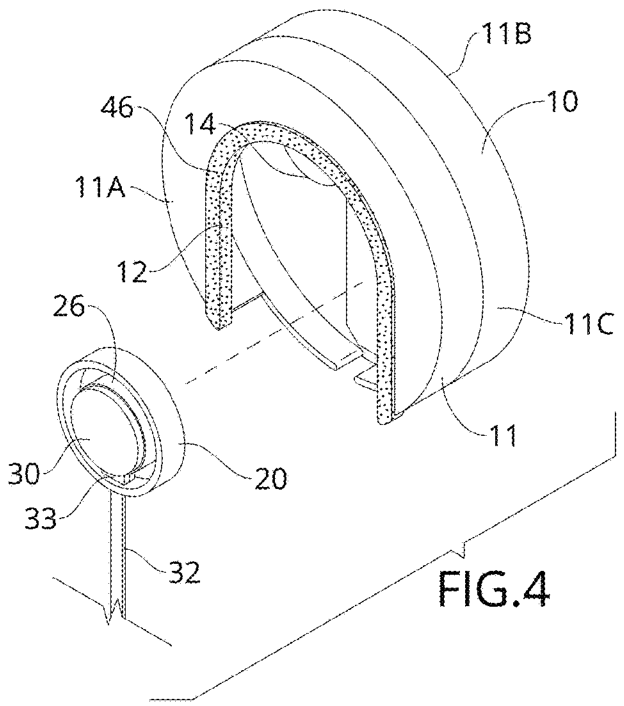
FIG. 4 is an inner perspective view similar to FIG. 2, showing removal of a speaker component of the device.

According to various embodiments, as depicted in FIGS. 1-10, disclosed is an audio ear speaker device 10, generally comprising a device housing 11 configured to cup the ear 40 of a user 38, and a speaker 26 within device housing 11. In certain embodiments, device housing 11 is configured to hold speaker 26 in proximity to user's ear 40 so that the speaker does not need to be inserted into the ear canal. Additionally, device housing 11 is configured to be supported by the top of the outer ear (i.e. helix) without pressing against the ear.

Figure 7:
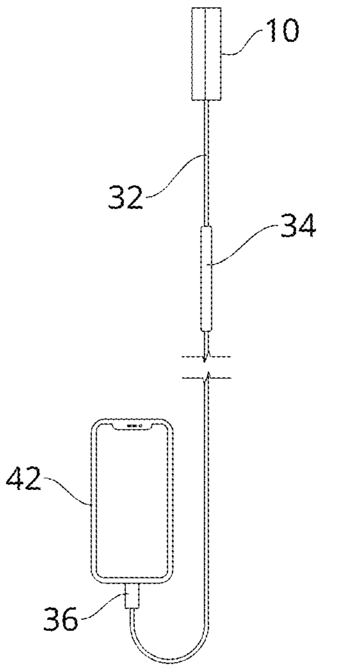
FIG. 7 is a schematic view of a single ear speaker device connected to an audio source.
Figure 8:
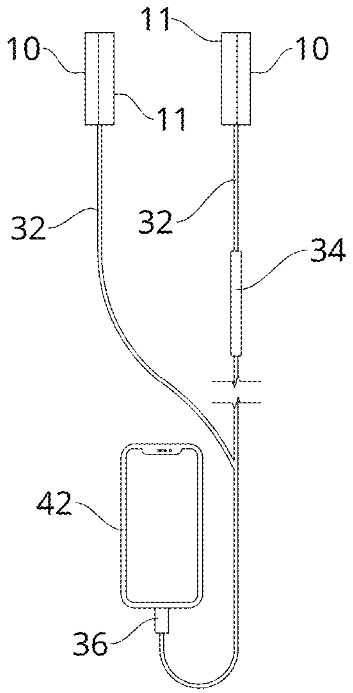
FIG. 8 is a schematic view of a dual ear speaker device connected to an audio source.

In some embodiments as best depicted in FIGS. 7-8, speaker 26 may include wiring 32 that may pass through device housing 11, to connect speaker 26 to an audio device 42 such as a cell phone, computer, MP3 player, and the like, via plug (e.g., USB) or jack element 36. In certain embodiments, wiring 32 may be wound stored within housing 11. In some embodiments wiring may include in-line controls 34, but not necessarily so. In certain embodiments, the disclosed system may provide a dual speaker device, which includes two of devices 10 with wirings 32 in each device the merge to connect to device 42 as shown in FIG. 8. In other embodiments, speaker 26 may be a wireless, i.e., Bluetooth speaker.

Figure 5:
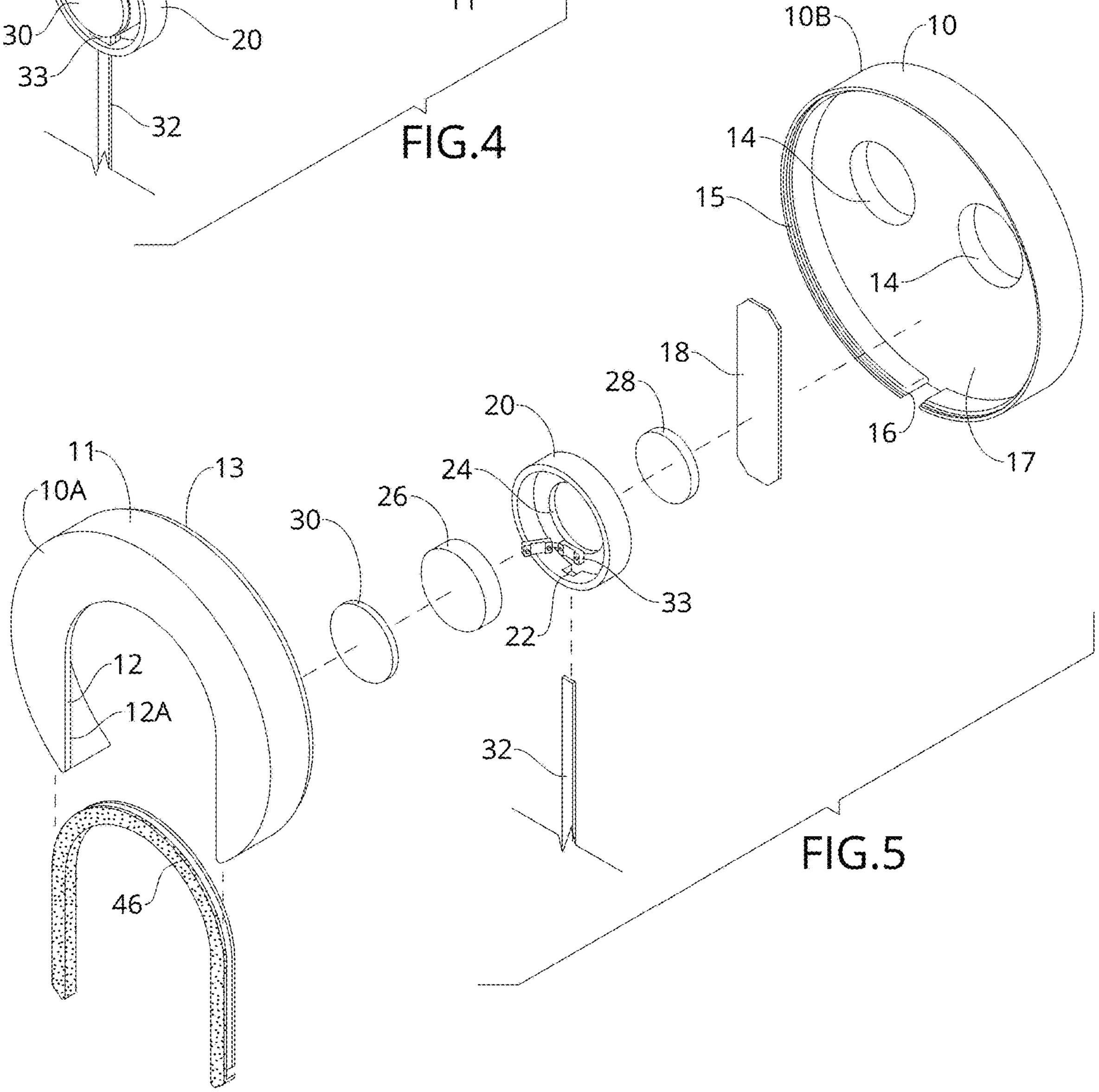
FIG. 5 is an exploded view of the device.
Figure 6:
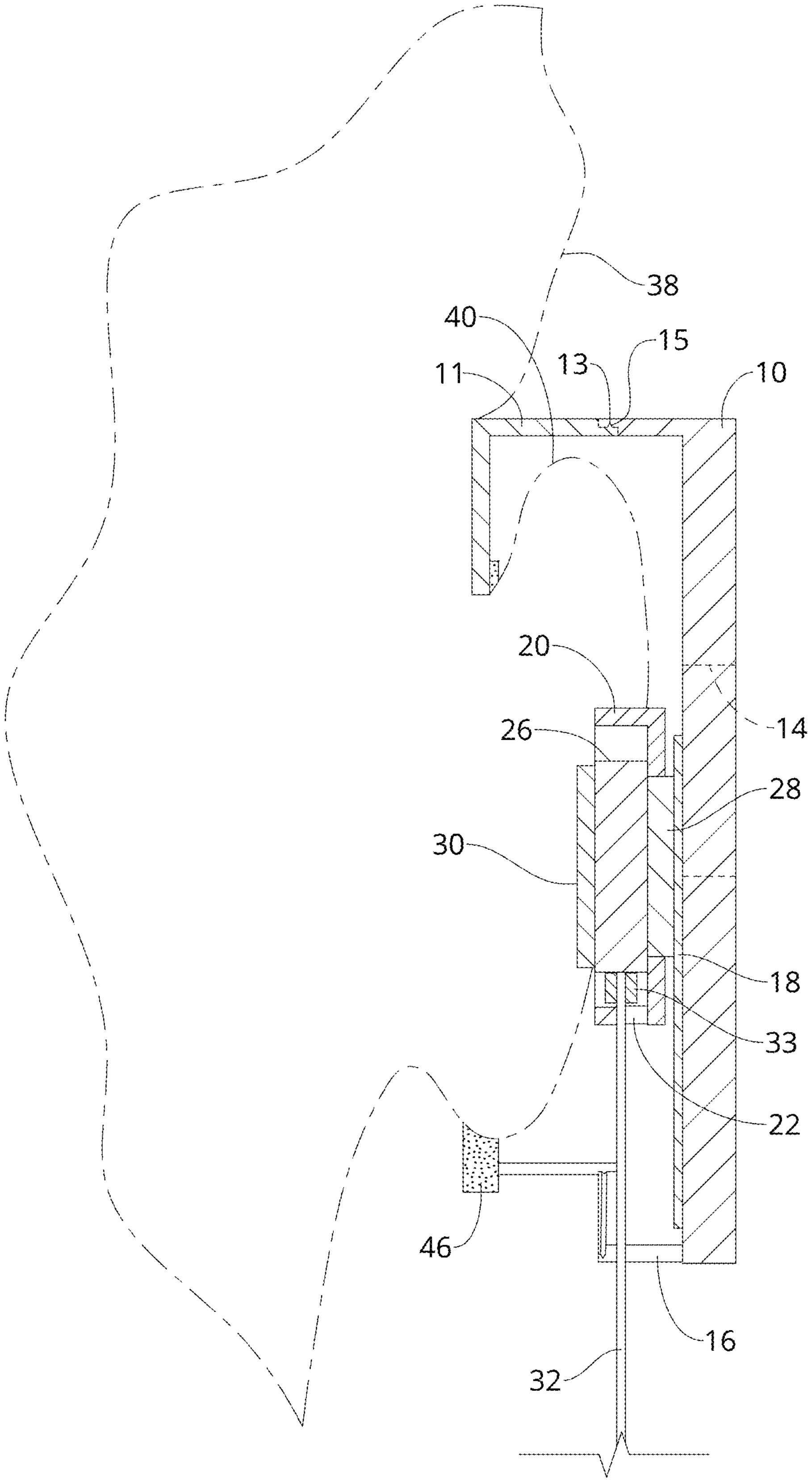
FIG. 6 is a section view taken along line 6-6 in FIG. 1.

In certain embodiments, device housing 11 may have a cylindrical shape including an inner wall 11A, an outer wall 11B, and a side wall 11C, with a generally a low profile. According to an exemplary embodiment, device housing 11 may be approximately 2.5 to about 3.5 inches, or about 3 inches in diameter, with a thickness of about 0.75 to about 1.25 inches, or about 1 inch. In certain embodiments, device housing 11 may comprise an assembly of a first housing part 10A that includes inner wall 11A and a first portion of side wall 11C, and a second housing part 10B that includes outer wall 11B and a second portion of the side wall. In some embodiments, first housing part 10A and second housing part 10B may be configured to attach via means such as a threaded connection, a friction fit connection, and the like. In one example as depicted in FIG. 5, a housing male thread 13 is provided at a side wall edge of first housing part 10A, and is configured to thread or otherwise couple to a female thread 15 at the side wall edge of second housing part 10B. This enables user 38 to disassemble and reassemble the device housing to easily access its internal components. In some further embodiments, an adapter piece configured to thread between housing male thread 13 and housing female thread 15 may be provided for allowing a user to optionally expand the size of the housing. It shall be appreciated however, that device housing 11 may be a unitary piece in alternate embodiments.

In embodiments, speaker 26 is supported on an interior side of outer wall 11B. A cutout forming an ear slot 12 sized to receive the user's outer ear is further provided within inner wall 11A and a bottom portion of side wall 11C. In certain embodiments, ear slot 12 may have a generally inverted U-shape as shown and enables device 10 to suspend from a top part of the outer ear. In one embodiment, ear slot 12 (i.e., "ear receiving slot") may be about 1.5 inches to about 2 inches, or about 1.75 inches wide. In some embodiments, a cushioned pad 46 may be attached to the framing edge 12A of slot 12 to cushion and protect the ear against the hard and/or sharp edges of the edge. In some embodiments, cushioned pad 46 may be made of silicone, but not necessarily so.

Figure 9:
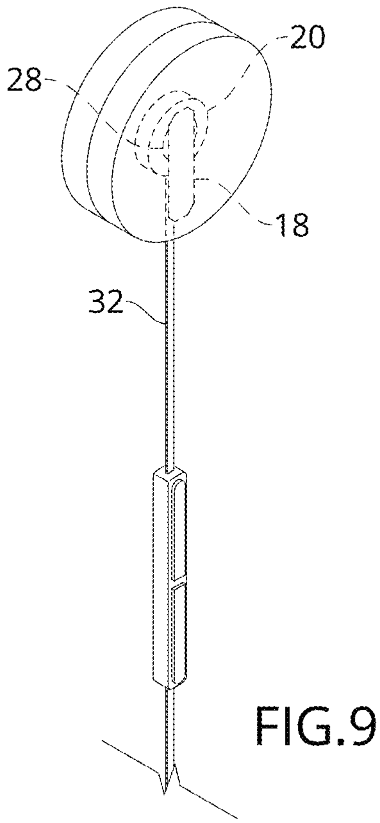
FIG. 9 is a perspective view of an audio ear speaker device in accordance with an alternate embodiment.
Figure 10:
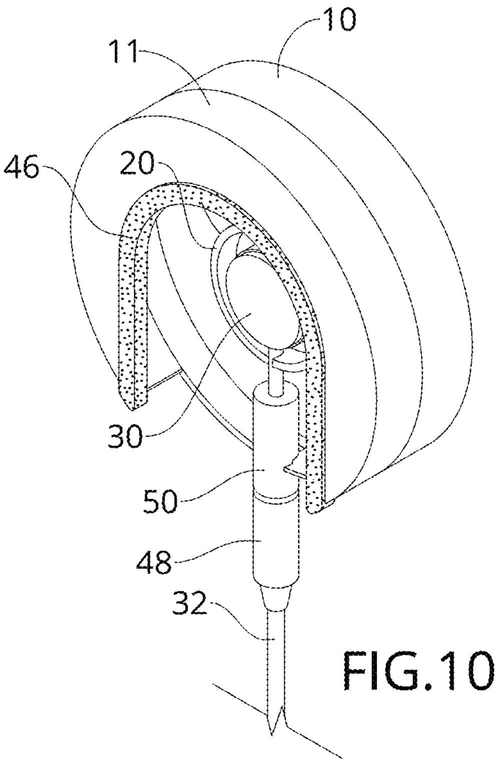
FIG. 10 is a perspective view of the audio ear speaker device.

In some embodiments, device housing 11 may include a bottom notch 16 for allowing speaker wiring 32 and/or various connectors 50, 48, to pass. In some further embodiments, as best depicted in FIGS. 1-6, housing 11 may include one or more holes 14 that provide ventilation and allow the user to hear other ambient sound. In one embodiment, two holes 14 may be provided at left and right sides sections of outer wall 11B. In other embodiments, holes 14 may be included in any part of the housing. Additionally, in some other embodiments as depicted in FIG. 9, holes 14 may be omitted.

In certain embodiments, speaker 26 may optionally include a speaker pad 30 on an inner side of speaker 26 facing user's ear 38, and is configured to block frequency for user comfort and ear health. In one embodiment, speaker pad 30 may be made of a thin silicone sheet, which may be about 0.2 inches to about 0.05 inches thick, or about 0.0625 inches thick, and is adhesively attached to the speaker.

In certain embodiments, speaker 26 may be retained within a speaker housing 20 coupled to the internal side of outer wall 11B. In some embodiments, speaker housing 20 may include a wire notch 22 for allowing speaker wire 32 to pass, and a plastic or metal clamp 33 for preventing speaker wire 32 from being accidentally pulled out.

In certain embodiments, the position of speaker 26 and speaker housing 20 may be adjustable within an internal surface 17 of wall 11B. In one embodiment, a magnet 28 may be attached to speaker 26 on a side of the magnet facing wall 11B opposite speaker pad 30, wherein speaker housing 20 may include a hole 24 though which magnet 28 is exposed. In some embodiments, magnet 28 may be neodymium and may be adhesively attached to the speaker. In certain embodiments, a plate 18 made of steel or other ferromagnetic metal, to which magnet 28 is attracted, may be attached to internal surface 17. As such, speaker 26 may be positioned at any position within plate 18. In one embodiment, plate 18 may be elongated and centered, e.g., between holes 14, allowing the vertical position of speaker 26 to be adjusted. The non-permanent magnetic attachment further allows speaker 26 to be removed and replaced with another speaker also including an attached magnet, and/or earbuds that may be held in place via clamp 33. It shall be appreciated that other non-permanent attachment elements, such as a hook and loop tape may be used in alternate embodiments. It shall be appreciated that speaker 26 may be permanently affixed to internal surface 17 in alternate embodiments.

Thus, the disclosed subject matter provides a speaker device which protects from hearing damage associated with the use of conventional earbuds and/or speakers that channel sound directly into the ear canal. Unlike earbuds, the disclosed device is not inserted into the ear canal. Additionally, the device does not press against the head or ears of the user, and stores compactly, in contrast to traditional headphones. The device further allows a user to hear other ambient sounds while using the device.

It shall be appreciated that the disclosed device and system can have multiple configurations in different embodiments. It shall be appreciated that the device and system described herein may comprise any alternative known materials in the field and be of any color. It shall be appreciated that the device housing and ear slot may be of different size, and/or dimensions depending on the side of the user's ear, user preferences/needs, design preferences, etc. It some embodiments, the device housing may incorporate a fanciful design, such as an animal's ear (e.g., cat Lynx, Antelope, jack rabbit, monkey, etc.), star shape, ball shape, etc. In some embodiments, the disclosed device may include an imprinted logo or other artwork, graphics, etc. In some further embodiments, a sound absorbing material, such as a soft/fuzzy fabric, may be added inside the device housing to absorb radio frequency sound waves.

In some embodiments, device housing 10 may be made of a light weight metal, such as tin, or a plastic. However, different materials may be used in alternate embodiments. It shall be appreciated that the device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

PARTS LIST

10 audio ear speaker device
10A first housing part
10B second housing part
11 device housing
11A inner wall
11B outer wall
11C side wall
12 ear slot
12A framing edge
13 housing male thread
14 holes
15 female thread
16 bottom notch
17 internal surface
18 plate
20 speaker housing
22 wire notch
24 hole
26 speaker
28 magnet
30 pad
32 speaker wire
33 metal clamp
34 in-line controls

36 jack element

38 user

40 ear

42 audio device

46 cushioned pad

What is claimed is:

1. An ear supported audio device, comprising:

a cylindrical device housing configured hang from a helix of a user's ear, the device housing including an inner wall, an outer wall, and a side wall extending between the inner wall and the outer wall;

a speaker attached to an interior side of the outer wall of the device housing; and a cutout forming an ear receiving slot within the inner wall and bottom portion of the side wall, wherein an interior side of the outer wall faces an exterior side of the outer wall, and wherein the interior side of the outer wall is configured to face towards the user's ear when the device is worn, wherein the cutout has an inverted U-shape, and the audio device further comprising a cushioning material covering a bordering edge of the cutout.

2. The audio device of claim 1, wherein the cushioning material comprises silicone.

3. The audio device of claim 1, further comprising one or more holes in the outer wall of the device housing.

4. An ear supported audio device, comprising:

a cylindrical device housing configured hang from a helix of a user's ear, the device housing including an inner wall, an outer wall, and a side wall extending between the inner wall and the outer wall;

a speaker attached to an interior side of the outer wall of the device housing; and a cutout forming an ear receiving slot within the inner wall and bottom portion of the side wall, wherein an interior side of the outer wall faces an exterior side of the outer wall, and wherein the interior side of the outer wall is configured to face towards the user's ear when the device is worn, wherein the device housing is about 2.5 inches to about 3.5 inches in diameter, and has a thickness of about 0.75 to about 1.25 inches, and wherein the cutout is about 1.5 inches to about 2 inches wide.

5. The audio device of claim 4, wherein the cutout has an inverted U-shape.

6. The audio device of claim 4, further comprising one or more holes in the outer wall of the device housing.

7. An ear supported audio device, comprising:

a cylindrical device housing configured hang from a helix of a user's ear, the device housing including an inner wall, an outer wall, and a side wall extending between the inner wall and the outer wall;

a speaker attached to an interior side of the outer wall of the device housing; and a cutout forming an ear receiving slot within the inner wall and bottom portion of the side wall, wherein an interior side of the outer wall faces an exterior side of the outer wall, and wherein the interior side of the outer wall is configured to face towards the user's ear when the device is worn, wherein the device housing comprises an assembly of a first housing part that includes the inner wall and a first portion of the side wall, and a second housing part that includes the outer wall and a second portion of the side wall, wherein the first housing part and second housing part are configured to attach and detach from one another.

8. The audio device of claim 7, wherein the cutout has an inverted U-shape.

9. The audio device of claim 7, further comprising one or more holes in the outer wall of the device housing.

10. An ear supported audio device, comprising:

a cylindrical device housing configured hang from a helix of a user's ear, the device housing including an inner wall, an outer wall, and a side wall extending between the inner wall and the outer wall;

a speaker attached to an interior side of the outer wall of the device housing; and a cutout forming an ear receiving slot within the inner wall and bottom portion of the side wall, wherein an interior side of the outer wall faces an exterior side of the outer wall, and wherein the interior side of the outer wall is configured to face towards the user's ear when the device is worn, wherein the speaker includes a sound absorbing pad attached to an inner side of the speaker facing the user's ear when the device is worn.

11. The audio device of claim 10, wherein the cutout has an inverted U-shape.

12. The audio device of claim 10, further comprising one or more holes in the outer wall of the device housing.

13. An ear supported audio device, comprising:

a cylindrical device housing configured hang from a helix of a user's ear, the device housing including an inner wall, an outer wall, and a side wall extending between the inner wall and the outer wall;

a speaker attached to an interior side of the outer wall of the device housing; and a cutout forming an ear receiving slot within the inner wall and bottom portion of the side wall, wherein an interior side of the outer wall faces an exterior side of the outer wall, and wherein the interior side of the outer wall is configured to face towards the user's ear when the device is worn, wherein the position of speaker is adjustable within the interior side of the outer wall.

14. The audio device of claim 13, wherein the speaker includes a magnetic backing that is attachable to a ferromagnetic plate provided within the interior side of the outer wall.

15. The audio device of claim 13, wherein the cutout has an inverted U-shape.

16. The audio device of claim 13, further comprising one or more holes in the outer wall of the device housing.

17. An ear supported audio device, comprising:

a cylindrical device housing configured hang from a helix of a user's ear, the device housing including an inner wall, an outer wall, and a side wall extending between the inner wall and the outer wall;

a speaker attached to an interior side of the outer wall of the device housing; and a cutout forming an ear receiving slot within the inner wall and bottom portion of the side wall, wherein an interior side of the outer wall faces an exterior side of the outer wall, and wherein the interior side of the outer wall is configured to face towards the user's ear when the device is worn, wherein the speaker is retained within a speaker housing, the speaker housing being coupled to the interior side of the outer wall, and includes a notch for allowing a speaker wire to pass.

18. The audio device of claim 17, wherein the cutout has an inverted U-shape.

19. The audio device of claim 17, further comprising one or more holes in the outer wall of the device housing.

* * * * *